United States Patent [19]

Hirono et al.

[11] Patent Number: 5,110,782
[45] Date of Patent: May 5, 1992

[54] PROCESS FOR PRODUCING PEROVSKITE-TYPE OXIDE CATALYST

[75] Inventors: Hatsuo Hirono, Nyuzen; Koichi Moriyama, Uozu; Hideo Fukui, Kurobe; Ikuya Matsuura, Toyama, all of Japan

[73] Assignee: Yoshida Kogyo K.K., Tokyo, Japan

[21] Appl. No.: 507,601

[22] Filed: Apr. 10, 1990

[30] Foreign Application Priority Data

Apr. 25, 1989 [JP] Japan .................... 1-103354

[51] Int. Cl.5 .................. B01J 23/10; B01J 23/76; B01J 37/03; B01J 37/14
[52] U.S. Cl. ...................... 502/303; 502/525
[58] Field of Search ............ 502/525, 303; 423/593

[56] References Cited

U.S. PATENT DOCUMENTS

| | | | |
|---|---|---|---|
| 4,060,500 | 11/1977 | Clavenna et al. | 502/324 |
| 4,065,544 | 12/1977 | Hamling et al. | 423/252 |
| 4,473,542 | 9/1984 | David | 423/594 |
| 4,590,090 | 5/1986 | Siemers et al. | 423/593 X |
| 4,654,075 | 3/1987 | Cipollini | 423/593 X |
| 4,812,300 | 3/1989 | Quinlan et al. | 502/525 X |
| 4,853,199 | 8/1989 | Inoue et al. | 423/593 X |
| 4,886,654 | 12/1989 | Ohga et al. | 502/525 X |
| 4,988,671 | 1/1991 | Johnson | 423/593 X |

FOREIGN PATENT DOCUMENTS 0150238 8/1985 European Pat. Off. .
0205102 12/1986 European Pat. Off. .
2306739 5/1976 France .

*Primary Examiner*—W. J. Shine
*Assistant Examiner*—Douglas J. McGinty
*Attorney, Agent, or Firm*—Flynn, Thiel, Boutell & Tanis

[57] ABSTRACT

The present invention provides a process for producing a perovskite-type oxide catalyst. The process comprises the steps of reacting an aqueous solution containing plural metal salts, such as chloride, sulfate, nitrate, etc., and an aqueous solution of a neutralizer such as alkali carbonate, alkali hydroxide, ammonia, etc., so as to cause coprecipitation of neutral salts and firing the coprecipitated salts to provide a perovskite-type oxide. At least one organic substance selected from the group consisting of cellulose, polyvinyl acetate, polyethylene, polystyrene, polypropylene, polyvinyl alcohol, starch, gelatin and saccharide is added prior to the firing step. The addition of the organic substance makes possible the attainment of a highly active perovskite-type oxide catalyst composed of very fine particles (primary particles).

9 Claims, 2 Drawing Sheets

PROCESS FOR PRODUCING PEROVSKITE-TYPE OXIDE CATALYST

BACKGROUND OF THE INVENTION

1. Field of the Invention

The present invention relates to a process for producing a perovskite-type oxide catalyst useful in the catalytic combustion of combustible gases such as hydrogen, carbon monoxide or hydrocarbons.

2. Description of the Prior Art

Since perovskite-type oxides ($ABX_3$ type) are very stable, it is possible to form catalytically active sites, such as defects while maintaining the crystal structure of the oxides. Therefore, perovskite-type oxides have had great expectations as oxidizing catalysts.

In known production processes of perovskite-type oxide catalysts, a firing of the raw materials at high temperatures is needed. However, this high temperature firing causes an unfavorable grain growth of the resultant catalyst, and reduces the catalytically active sites. Consequently, a sufficiently high catalytic activity can not be obtained.

SUMMARY OF THE INVENTION

In view of the foregoing problems, an object of the present invention is to provide a process for producing a perovskite-type oxide catalyst having a high activity by minimizing the grain growth which may occur during the firing step in the production process.

According to the present invention, there is provided a process for producing a perovskite-type oxide catalyst, the process comprising the steps of reacting an aqueous solution containing plural metal salts, such as chlorides, sulfates, nitrates, etc., and an aqueous solution of a neutralizer such as alkali carbonates, alkali hydroxides, ammonia, etc., so as to cause coprecipitation of neutral salts; and firing the coprecipitated salts to provide a perovskite-type oxide, characterized in that at least one organic substance selected from the group consisting of cellulose, polyvinyl acetate, polyethylene, polystyrene, polypropylene, polyvinyl alcohol, starch, gelatin and saccharide is added to the coprecipitated salts prior to the firing step.

The present invention can provide highly active perovskite-type oxide catalysts composed of very fine particles (primary particles) by adding the foregoing organic substances such as cellulose, etc., prior to the firing step of the production process.

DETAILED DESCRIPTION OF THE PREFERRED EMBODIMENTS

The organic substances used in the present invention should be decomposed below the sintering temperature of the catalyst and carbon should not remain in the catalyst after the organic substance decomposition. Such organic substances are one or more substances selected from the group consisting of cellulose, polyvinyl acetate, polyethylene, polystyrene, polypropylene, polyvinyl alcohol, starch, gelatin and saccharide. The addition amount of the organic substances is at least 0.1% by weight, preferably about 1% by weight, with respect to the weight of the catalyst.

When the foregoing organic substance is added before the firing step, they enclose fine particles therein prior to the formation of a perovskite structure in such a manner that the entire surface of each fine particle is coated with a film of the organic substance and thereby contact between the fine particles is prevented. Consequently, growth of the catalyst particles during the firing step is minimized and very fine primary particles having many catalytically active sites can be obtained.

The present invention will be described in detail with reference to the Example hereinafter. Example An aqueous sodium hydroxide solution (NaOH : 0.5N) was added to 100 ml of an aqueous solution of a mixture consisting of 16.07 g of hydrated lathanium nitrate with six water molecules, 1.20 g of hydrated cobalt nitrate with six water molecules, 0.70 g of silver nitrate and 14.99 g of hydrated iron nitrate with nine water molecules over a period of approximately one hour under stirring until the aqueous solution was brought to a pH of 12. The resultant aqueous solution was further stirred for 3 hours. The thus obtained precipitate was fully washed several times with water by decantation, filtered and dried at 120° C. for 12 hours. Thereafter, crystalline cellulose was added in certain amounts (as shown by circles in a graph of FIG. 1) and then hot water was added to dissolve the crystalline cellulose. After mixing, each mixture was evaporated to dryness, pulverized and fired at 600° C. for 5 hours in a stream of air. There was obtained a perovskite-type oxide ($La_{0.9}Ag_{0.1}Co_{0.9}Fe_{0.1}O_3$).

Figure 1:
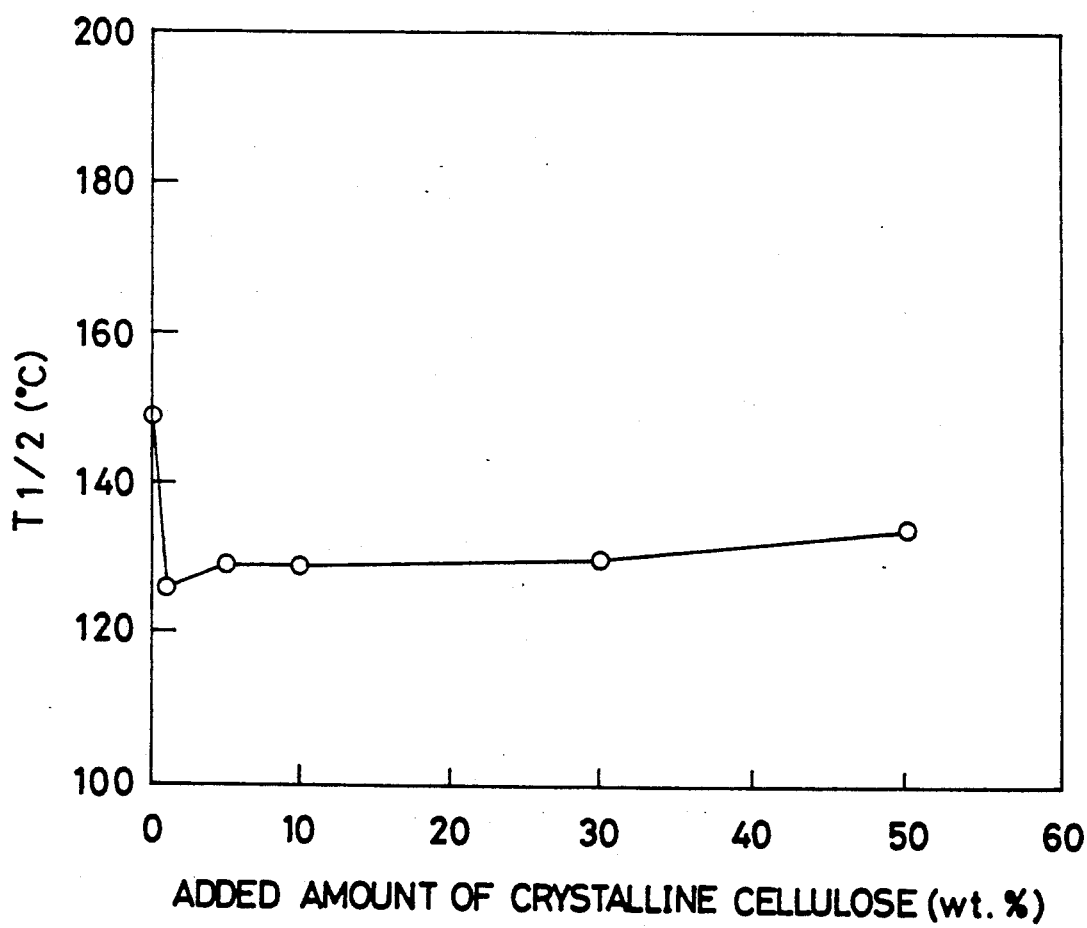
FIG. 1 is a graph showing the effect of the present invention in which the relationship between the added amount of crystalline cellulose and the combustion temperature (T 1/2) when combustion of hydrogen is 50% is shown.

The thus obtained products were confirmed to have a perovskite structure by X-ray diffraction. The oxide particles were sieved to obtain catalyst particles having a secondary particle size of 38 to 106 $\mu m$. Using 0.3 g of each oxide catalyst, a combustion test was conducted for air containing 1% by volume hydrogen which was fed at a rate of 100 ml/minute. FIG. 1 shows the relationship between the amount of the added crystalline cellulose and the combustion temperature (T1/2) when the combustion of hydrogen was 50%, for each perovskite oxide catalyst.

Figure 2:
FIG. 2 is an SEM (scanning electron microscopy) micrograph showing the particle structure of a specimen prepared with the addition of crystalline cellulose in accordance with the present invention.
Figure 3:
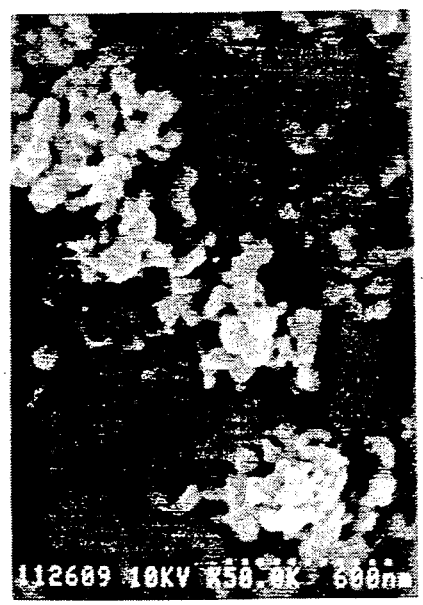
FIG. 3 is an SEM micrograph showing the particle structure of a comparative specimen produced without addition of crystalline cellulose.

As is clear from FIG. 1, the activity of the catalyst is improved by adding the crystalline cellulose. Particularly, the catalyst showed the highest activity when the crystalline cellulose was added in an amount of 1 wt.% and, specifically, showed a significant reduction of 23° C. in T1/2 of hydrogen, i.e., from 149° C. to 126° C. A similar combustion test was conducted for air containing 1% by volume propane at an air feeding rate of 100 ml/minute and the test result exhibited a T1/2 reduction of 27° C., namely, from 342° C. to 315° C. Such advantageous effects have been examined by comparing SEM micrographs (50000 magnifications) of two types of test samples with and without addition of the crystalline cellulose. The invention sample with the addition of the crystalline cellulosem, shown in FIG. 2, had an average diameter of the primary particles on the order of 60 nm while the comparative sample without the addition, shown in FIG. 3 had an average primary particle diameter of 107 nm. The size of the primary particles of the invention sample with the addition of the crystalline cellulose is about one-half that of the comparative sample without the addition and it is clear that the growth of particles during the firing step can be significantly prevented by adding the crystalline cellulose. Therefore, reduction of the active sites was minimized and the catalyst sample of the present invention exhibited a high activity.

The above Example is described only for the addition of crystalline cellulose, but polyvinyl alcohol and other organic substances as set forth in the claims or equivalent compounds all have similar results.

What is claimed is:

1. A process for producing a perovskite oxide catalyst consisting essentially of the steps of: providing a first aqueous solution containing a plurality of metal salts; providing a second aqueous solution containing a neutralizing compound for said plurality of metal salts; reacting said first aqueous solution with said second aqueous solution to cause coprecipitation of neutral salts; recovering said neutral salts; adding one or more organic substances selected from the group consisting of cellulose, polyvinyl acetate, polyethylene, polystyrene, polypropylene, polyvinyl alcohol, starch, gelatin and a saccharide to the coprecipitated salts to form a mixture of said organic substance(s) with coprecipitate salts; and firing said mixture to produce a perovskite oxide catalyst.

2. The process according to claim 1, wherein said metal salts are selected from the group consisting of metal chlorides, metal sulfates and metal nitrates.

3. The process according to claim 1, wherein said neutralizing compound is selected from the group consisting of alkali carbonates, alkali hydroxides and ammonia.

4. The process according to claim 1, wherein the amount of said organic substances(s) in said mixture is at least 0.1% by weight with respect to the weight of the catalyst.

5. The process according to claim 1, wherein said metal salts comprise lanthanum nitrate, cobalt nitrate, silver nitrate and iron nitrate.

6. The process according to claim 1, wherein said neutralizing compound is sodium hydroxide.

7. The process according to claim 1, wherein said organic substance is cellulose.

8. A process for producing a perovskite oxide catalyst comprising the steps of providing a first aqueous solution containing lanthanum nitrate, cobalt nitrate, silver nitrate and iron nitrate; providing a second aqueous solution containing sodium hydroxide; reacting said first aqueous solution with said second aqueous solution to cause coprecipitation of neutral salts; adding cellulose to the coprecipitate salts to from a mixture of cellulose with said coprecipitated salts; and firing said mixture to produce a perovskite oxide catalyst.

9. The process to claim 8, wherein cellulose is present in said mixture in an amount of 1% by weight with respect to the weight of the catalyst.

* * * * *

UNITED STATES PATENT AND TRADEMARK OFFICE
CERTIFICATE OF CORRECTION

PATENT NO. : 5 110 782
DATED : May 5, 1992
INVENTOR(S) : Hatsuo HIRONO et al

It is certified that error appears in the above-identified patent and that said Letters Patent is hereby corrected as shown below:

Column 3, line 30; after "with" insert ---said---.
Column 4, line 26; change "coprecipitate to ---coprecipitated---.
line 29; change "to" to ---of---.

Signed and Sealed this

Fourth Day of January, 1994

Attest:

BRUCE LEHMAN

Attesting Officer

Commissioner of Patents and Trademarks